(12) United States Patent
Saunders (10) Patent No.: US 6,772,483 B1
(45) Date of Patent: Aug. 10, 2004

(54) ROPE-SECURING DEVICE (76) Inventor: Cheryl L. Saunders, Kang-Won-Do, Wonju-City, Bong San-2Dong, 1201-23, Dong-Shin (A) 104-803 (KR)

( * ) Notice: Subject to any disclaimer, the term of this patent is extended or adjusted under 35 U.S.C. 154(b) by 0 days.

(21) Appl. No.: 10/234,899

(22) Filed: Sep. 4, 2002

Related U.S. Application Data (60) Provisional application No. 60/324,255, filed on Sep. 24, 2001.

(51) Int. Cl.[7] ............................................. F16G 11/04
(52) U.S. Cl. ................................... 24/136 R; 24/115 G
(58) Field of Search ........................ 24/128, 130, 115 R, 24/115 F, 115 G, 122.6, 136 R, 136 K, 71.1

(56) References Cited

U.S. PATENT DOCUMENTS

| | | | | |
|---|---|---|---|---|
| 4,336,636 A | * | 6/1982 | Ishiguro et al. ........... | 24/115 M |
| 4,724,584 A | * | 2/1988 | Kasai ......................... | 24/115 G |
| 5,008,981 A | * | 4/1991 | Smithson .................... | 24/66.9 |
| 5,361,461 A | * | 11/1994 | Anscher .................... | 24/115 G |
| 5,365,641 A | * | 11/1994 | Watanabe et al. .......... | 24/136 R |
| 5,979,028 A | * | 11/1999 | Hicks et al. ................ | 24/712.9 |
| 6,131,969 A | * | 10/2000 | Natkins ....................... | 292/323 |
| 6,279,205 B1 | * | 8/2001 | Steiner ......................... | 24/130 |
| 6,574,838 B2 | * | 6/2003 | Maurer ...................... | 24/136 R |

OTHER PUBLICATIONS

Belay Device (4 Pictures) Used with Ropes and Carabineer, The Device has Been Commercialized for Many Years.

* cited by examiner

Primary Examiner—Robert J. Sandy (57) ABSTRACT

A securing device for a rope loop is disclosed having a series of cutouts formed in a rigid base. Half loops are formed in the rope which are then placed within the cutouts and are held by moveable slides. Four cutouts are provided in the preferred form of the invention. A loop formed in the proximal end of the rope is maintained by the rope-securing device which, after use can be easily removed. In an alternate embodiment of the invention only two cutouts are provided in a rigid base for securing half loops and a longitudinal channel contains the proximal end of the rope which is maintained by a knot at the end.

16 Claims, 12 Drawing Sheets

(4 of 12 Drawing Sheet(s) Filed in Color)

ROPE-SECURING DEVICE

This application claims priority from Provisional Application No. 60/324,255 filed Sep. 24, 2001.

FIELD OF THE INVENTION

The invention herein pertains to securing a loop in a rope and particularly pertains to securing a non-slip loop in the end of a rope by use of a mechanical device.

BACKGROUND OF THE INVENTION

Hand tying various types of knots has always been used to secure ropes, cords, strings, wires and the like. One such usage of ropes is to tie helicopter rotor blades down to prevent accidental turning of the rotor blade at a landing or storage site to prevent excessive blade movement during windy weather and subsequent damage to the rotor blade. Conventionally, a helicopter blade Asleeve@ or Aboot@, is placed over the tip of each blade and a rope connected to the boot is then urged through a tie-down ring on the helicopter airframe. The rope is then manually drawn into a taut condition and while taut the end of the rope is wrapped therearound and tied with one or more knots. Since a typical helicopter has four blade tips, each boot is tied manually, with varying tension applied to each blade during tying. The rope often slips and becomes loose, requiring that particular rope to be retied. Also, desired equal tension on all four ropes is practically impossible to achieve and one or more boots may slip from the blade tips during gusty weather due to the uneven tension applied.

Thus, with the problems and disadvantages associated with prior art methods used in maintaining ropes under tension, the present invention was conceived and one of its objectives is to provide a rope-securing device which will allow the user to conveniently form and hold a loop in the end of a rope.

It is another objective of the present invention to provide a rope-securing device which includes a base in the form of a rigid block which defines a series of cutouts for retaining a rope half loop and a plurality of slides for engaging the half loops therein.

It is still another objective of the present invention to provide a rope-securing device having slides which include warning symbols or indicia to allow the user to quickly observe whether or not the rope is secured within the securing device.

It is a further objective of the present invention to provide a rope-securing device having a cover plate which will engage the slides within defined slots.

It is yet another objective of the present invention to provide a rope-securing device which can be easily used by inexperienced personnel to form a loop in a rope without the necessity of tying knots.

It is yet a further objective of the present invention to provide a rope-securing device in a second, simpler embodiment to allow a non-slip loop to be positioned in the end of a rope requiring fewer steps.

Various other objectives and advantages of the present invention will become apparent to those skilled in the art as a more detailed description is set forth below.

BRIEF SUMMARY OF THE INVENTION

The aforesaid and other objectives are realized by providing a rope-securing device which in the preferred embodiment includes a base formed of a rigid material having four cutouts for receiving rope half loops. A pair of slides are positioned on the base, each move in a transverse path across a pair of cutouts to engage the rope half loops. In use, a rope is formed into a half loop and urged into a cutout along one side of the base. The slide is then moved fully to the opposite side until a stop block on the base strikes the cover plate and then positioned beneath the half loop. A second half loop is then manually formed in the rope a short distance from the first half loop, towards the proximal end of the rope. The second half loop is then placed in a second cutout which is longitudinally aligned on the same side of the base. The second slide is then urged beneath the second half loop completely to the other side. Next, the proximal end of the rope extending from the second cutout is then passed through a tie-down ring or other attachment whereupon a loop is formed in the rope between the second and third cutouts. A third half loop is then formed in the rope beyond the tie-down ring which is then placed in a third cutout on the base on the other side. The second slide is then urged from its contact position against the cover plate and is slid beneath the third half loop. A fourth half loop is then formed in the rope near the proximal end and is placed in the fourth cutout. The first slide is moved from the cover plate to a position underneath the fourth half loop. Slack from the rope may be removed by pulling whereupon the securing device will then hold the rope in place and prevent the formed loop from slipping.

In a second embodiment of the invention for less critical applications only two cutouts are provided in the base and the proximal end of the rope extends from the second half loop through an attachment such as a tree limb, back to a longitudinal channel in one side of the base. A knot is manually tied as the rope exits the channel to prevent slippage of securing device along the rope.

BRIEF DESCRIPTION OF THE SEVERAL VIEWS OF THE DRAWING

This application contains drawings executed in color.

DETAILED DESCRIPTION OF THE INVENTION

Figure 1:
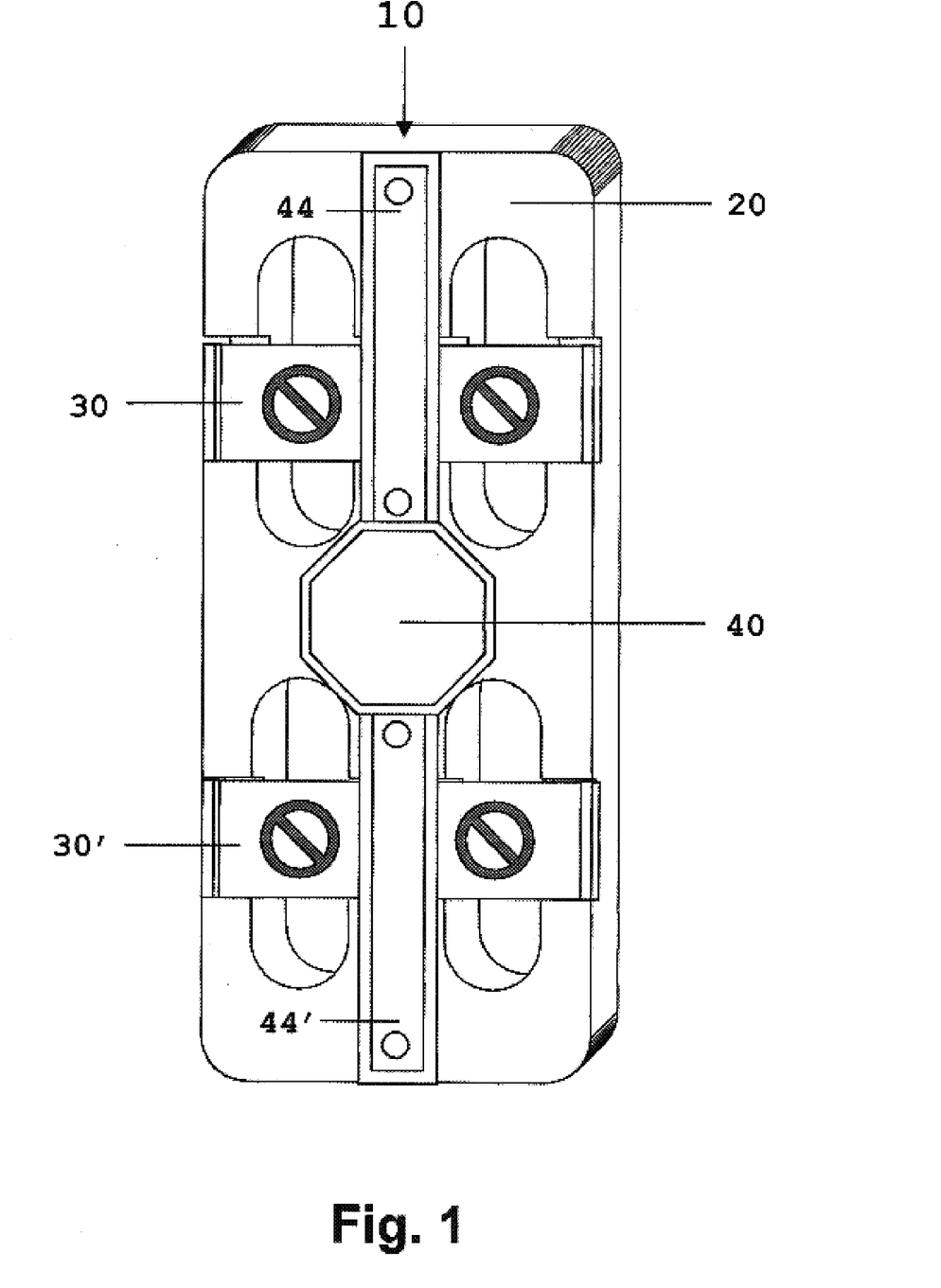
FIG. 1 shows a top perspective view of the preferred form of the securing device with the rope removed therefrom.
Figure 2:
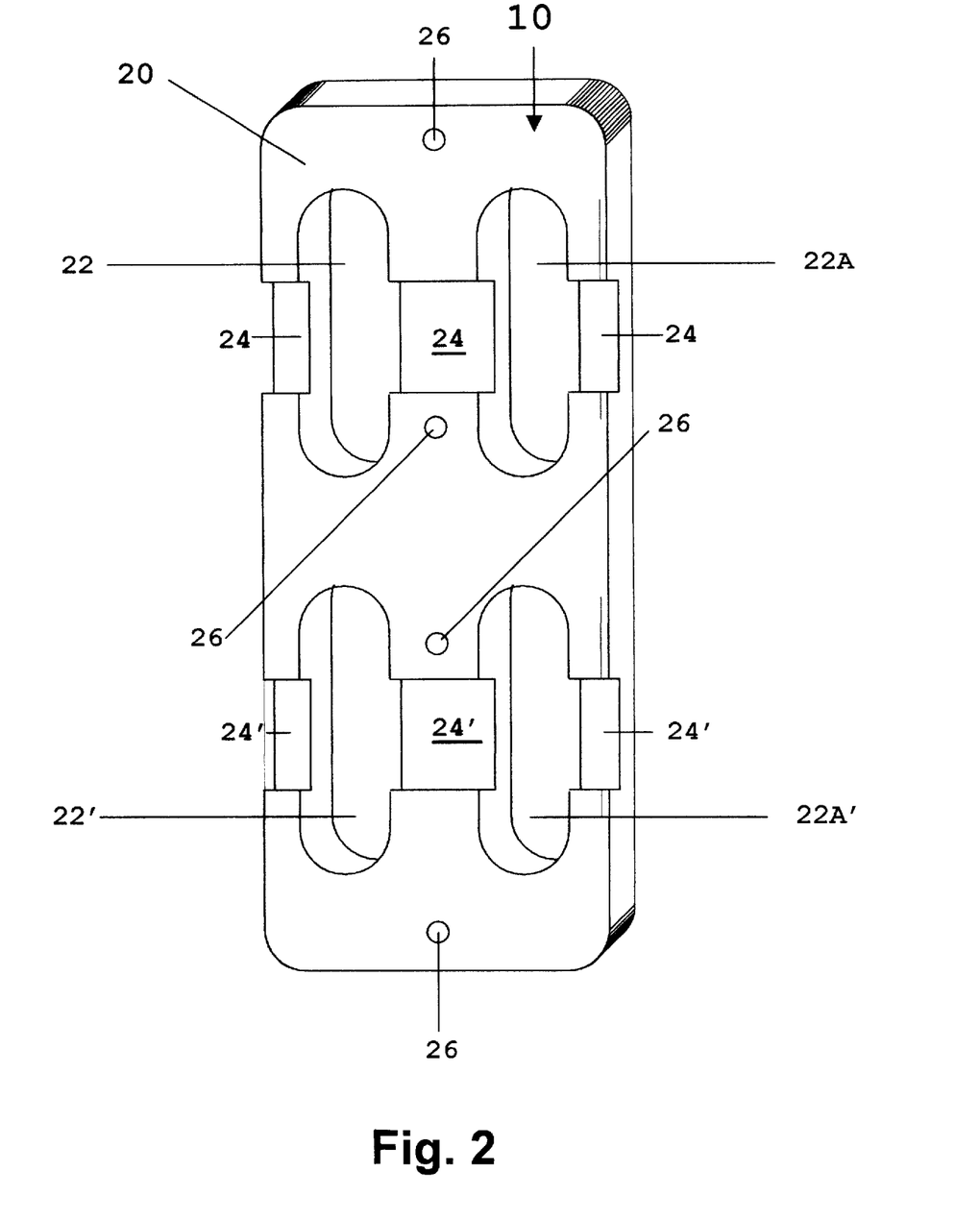
FIG. 2 illustrates a top perspective view of the base of the rope-securing device as shown in FIG. 1 with the slides and cover plate removed.
Figure 3:
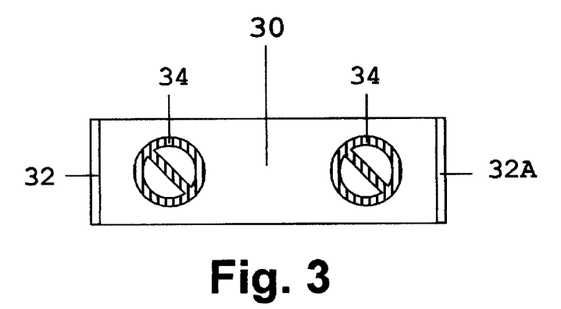
FIG. 3 demonstrates a view of one of the slides removed from the base.
Figure 4:
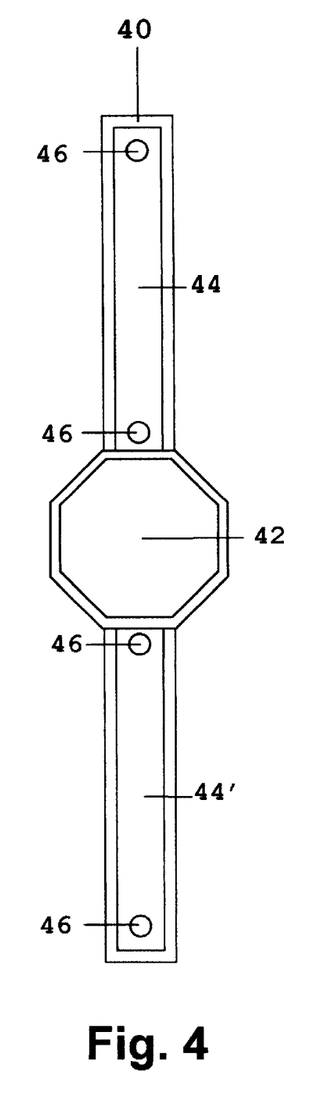
FIG. 4 pictures a view of the cover plate also removed from the base.
Figure 5:
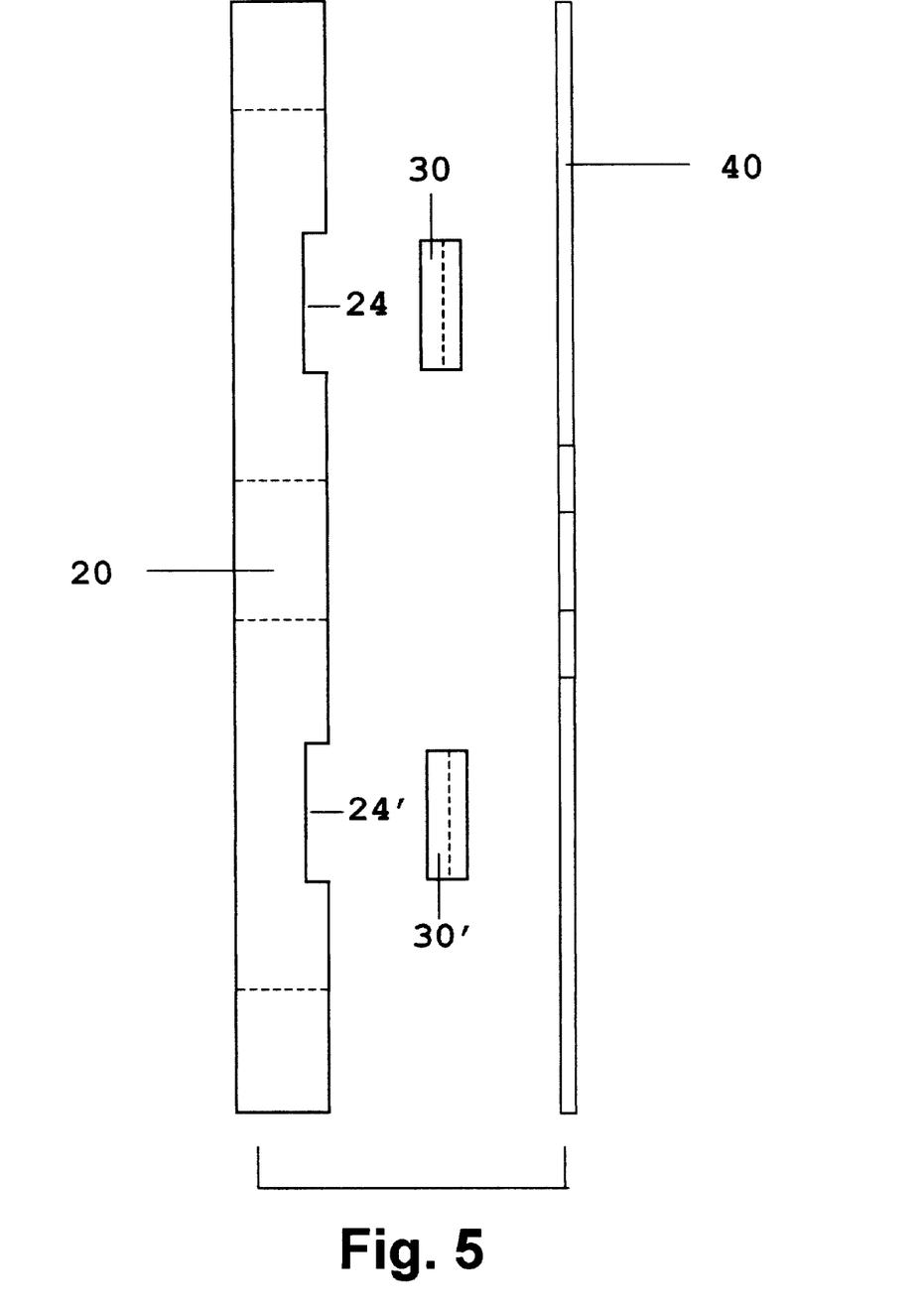
FIG. 5 shows a side view of the rope-securing device in exploded fashion.
Figure 6:
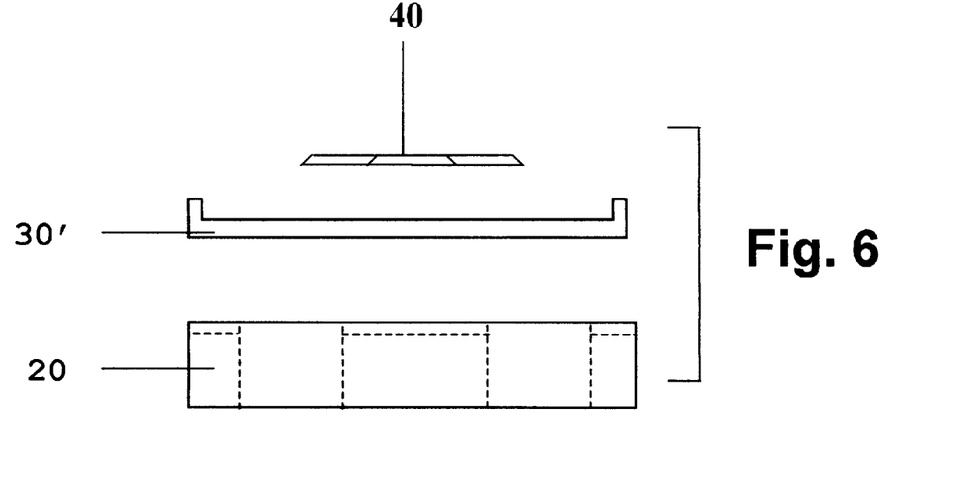
FIG. 6 depicts an end view of the rope-securing device as shown in FIG. 6 also in exploded format.

For a better understanding of the invention and its operation, turning now to the drawings, preferred rope-securing device 10 is shown in FIG. 1 having a rigid base 20 which may be formed of plastic, wood, metal or other suitable materials with cover plate 40 positioned over a pair of lateral slides 30, 30'. Slides 30, 30' are mounted in slots 24, 24' defined in base 20 as shown in FIGS. 2 and 5 which is preferably an aluminum block. Base 20 may be sized to accommodate various diameter ropes as are commercially available. (The term Arope@ is used herein as a generic term to identify rope, cords and straps of various kinds, materials and construction.) Slides 30, 30' as further shown in FIG. 3 are formed from a stiff, rigid, planar material preferably aluminum although other metals or material may be used. Pairs of integrally formed end stop blocks 32, 32A, 32', 32A' which collide with extensions 44, 44' of cover plate 40 as seen in FIG. 4 prevents slides 30, 30' from inadvertently slipping from beneath extensions 44, 44' and from base 20. Slide 30, as shown in FIG. 3 include preferably red warning indicia 34 placed thereon by painting, milling, etching, stamping, or otherwise, the surface of both slides 30, 30'.

Base 20 likewise defines a series of four cutouts 22, 22A, 22', 22A' which as shown in FIG. 2 pass completely through rigid base 20. Threaded screw holes 26 in base 20 are coincidentally aligned with screw holes 46 in cover plate 40 as shown in FIGS. 1 and 4 for standard screws or bolts (not seen) which maintain slides 30 within slots 24, 24' as shown in FIG. 2. Machine screws pass through screw holes 46 and into screw holes 26 of base 20 to maintain cover plate 40 and slides 30, 30' thereon. While two slides 30, 30' are seen in the preferred embodiment, more or less slides may be used under particular circumstances as desired.

Cover plate 40 as shown in FIGS. 4, 5, 6 and 7 includes an enlarged central hex portion 42 from which extensions 44, 44' depend. Cover plate 40 and extensions 44, 44' are all formed preferably of a thin, rigid aluminum such as by extrusion.

Figure 7:
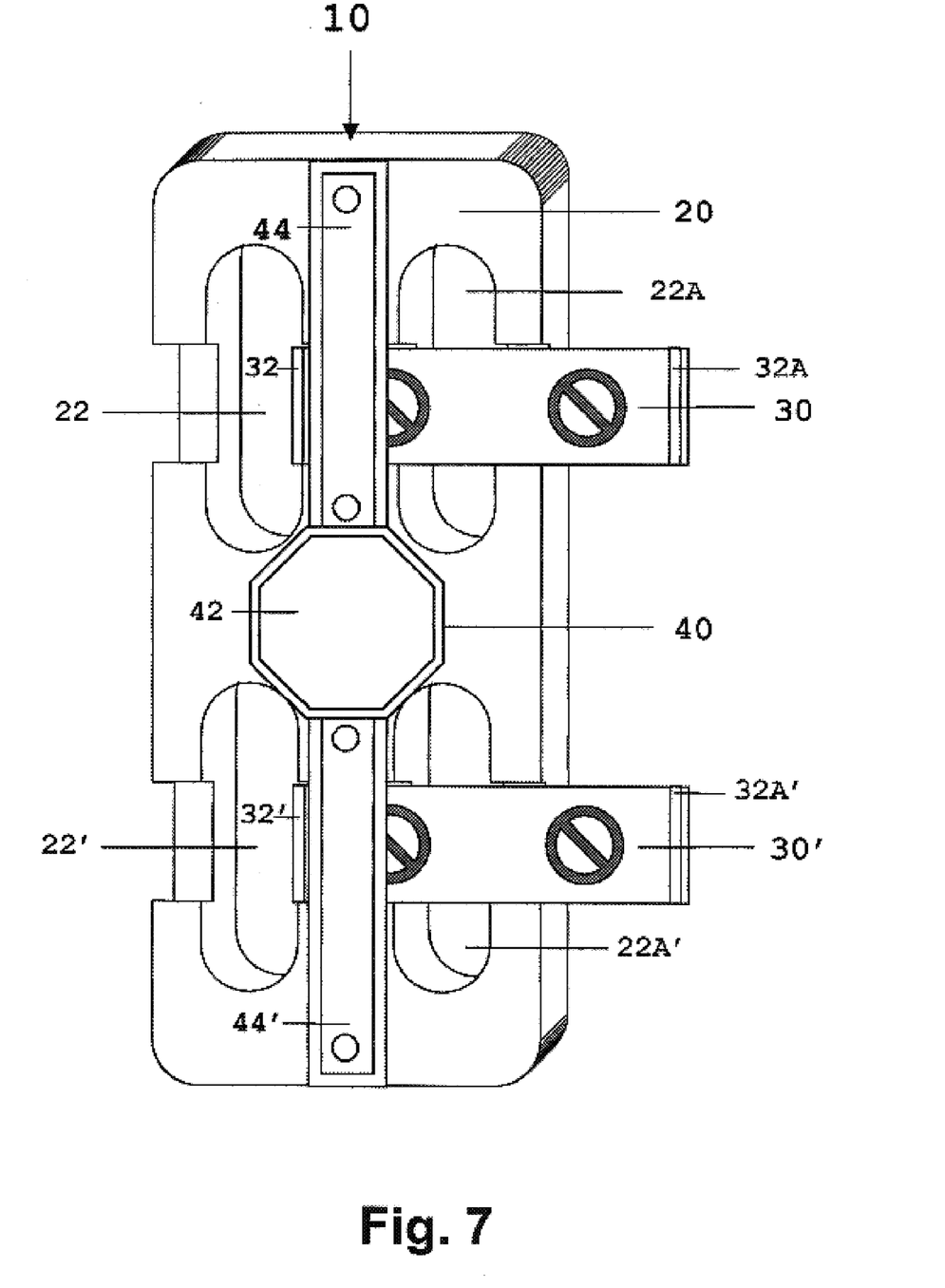
FIG. 7 demonstrates an assembled version of the rope-securing device as shown in FIG. 1 with the slides fully extended to the right side thereof.
Figure 8:
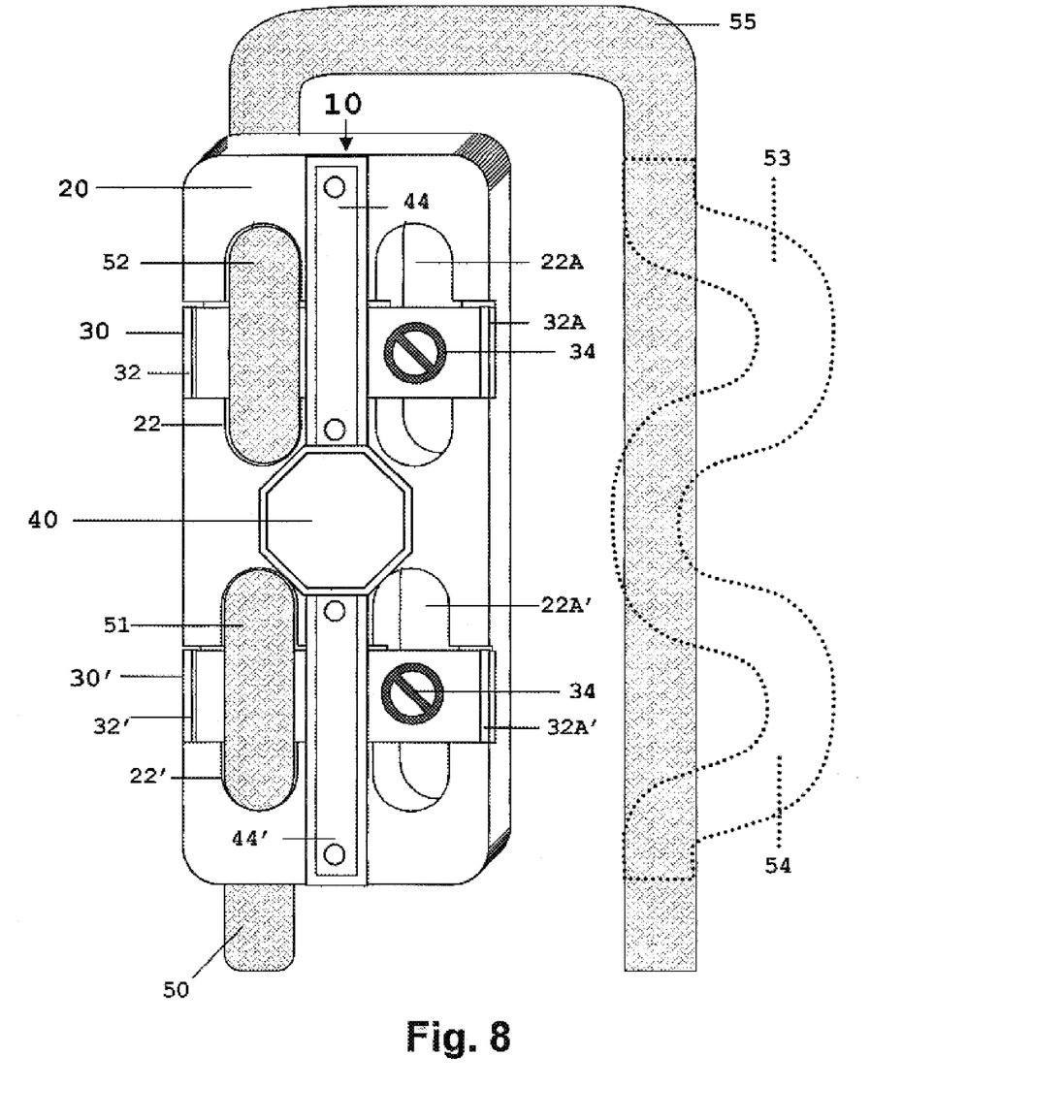
FIG. 8 features the rope-securing device as shown in FIG. 1 with two half loops of the rope engaged by the slides along one side thereof and with the proximal end of the rope remaining free.

The preferred method of using rope securing device 10 is demonstrated by particularly viewing FIGS. 7 and 8. In FIG. 7, both first, or upper slide 20 and second, or lower slide 30' have been positioned with stop blocks 32, 32' contacting extensions 44, 44' respectively and extending outwardly over the right side of base 20 to fully open first left side cutout 22 and second left side cutout 22' as seen. Fragnented rope 50 shown in FIG. 8 is manually formed into first half loop 51 and is then urged from beneath base 20 to transgress left cutout 22'. Next, slide 30' is moved through half loop 51 with stop block 32A' contacting extension 44+. Once slide 30+ is through half loop 51, half loop 52 is manually formed in rope 50 which is then inserted to transgress second left cutout 22 as shown in FIG. 8. Next, slide 30 as shown in FIG. 8 is manually slid through half loop 52 until stop block 32A contacts extension 44. A loop of sufficient size is then formed in the proximal end 55 of rope 50 for a tie-down or other attachment. Half loop 53 is formed in rope 50 and is placed in right third cutout 22A. Upper slide 30 is then moved from left to right (FIG. 8) beneath halt loop 53 to the position as shown in FIG. 8 beneath half loops 52 and 53. Again, as with half loop 53, half loop 54 is formed and placed in right (fourth) cutout 22A' The attachment loop (not seen) is then completely formed in a proximal end 55 of rope 60. Slide 30' is then moved from left to right beneath half loop 54 to the position as seen in FIG. 8 whereby rope 50 is then tightly secured within the four cutouts 22, 22A, 22', 22A' within base 20 of rope securing device 10. Warning indicia or logo 34 are then all fully covered by rope 50 and an observer can quickly tell that rope So is properly positioned within securing device 10. From the back of base 20 the user can grasp the free, proximal end 55 of rope 50 and pull any excess rope therefrom.

After rope 50 has been so installed and used, it can be removed easily as follows. Loop forming proximal end 55 of rope 50 is grasped and is pushed upwardly against half loop 54 so slide 30' as shown in FIG. 8 can be easily released and moved from right to left to enable half loop 54 to release from cutout 22A'. Likewise, in succession, half loops 53, 52 and 51 are removed from base 20 by moving slides 30, 30' as needed to thereby completely free rope 50 from securing device 10.

Figure 9:
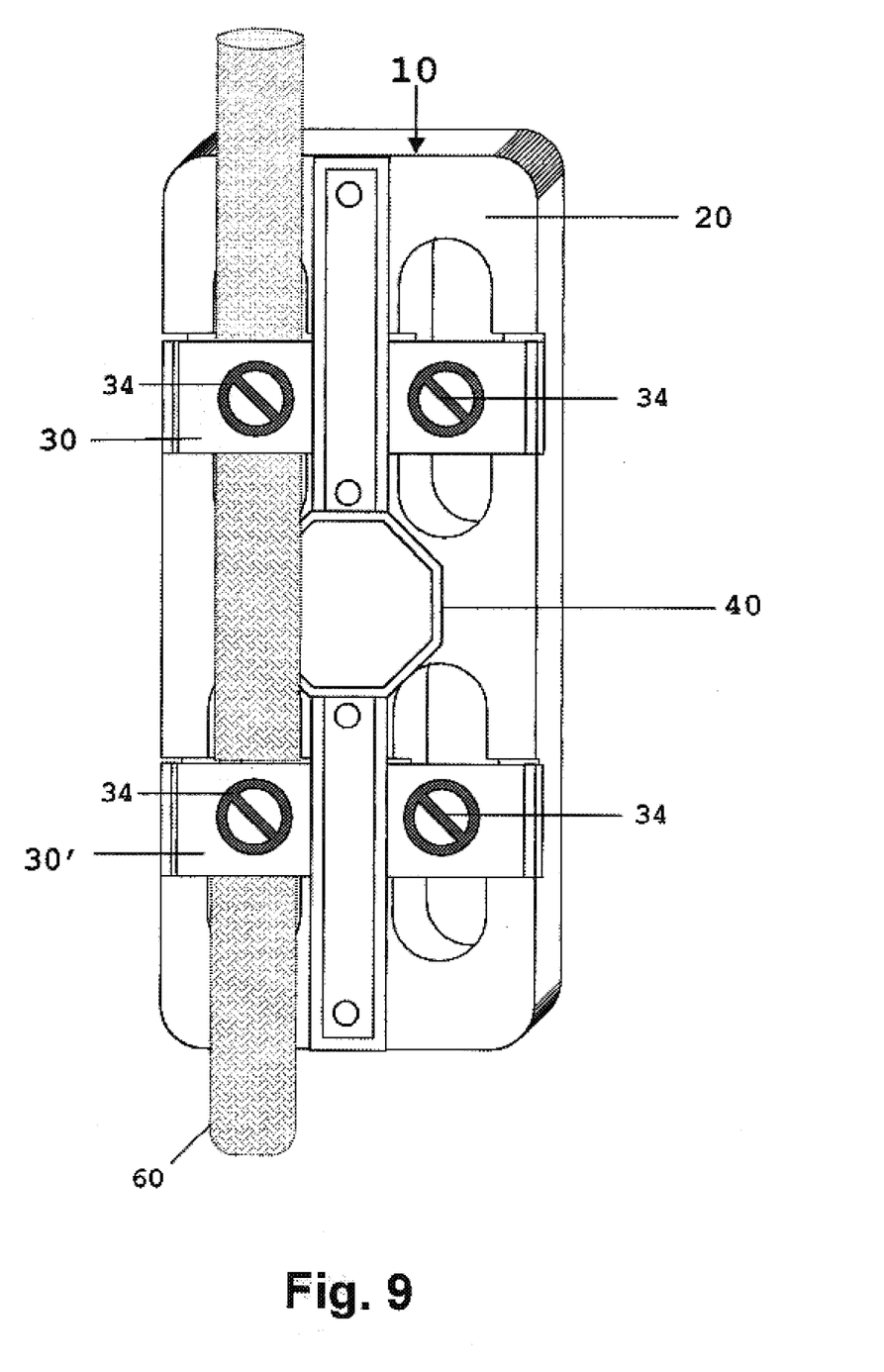
FIG. 9 illustrates the rope incorrectly positioned within the securing device.

In contrast, FIG. 9 shows an incorrect positioning of rope 60 whereby red warning indicia 34 is clearly visible to the observer above rope 60. The observer should then take action necessary to correct the one or more positions along rope 60 in securing device 10 to ensure that rope 60 is properly secured within base 20 as by removing rope 60 and installing it correctly to hide warning indicia 34 as earlier explained.

Figure 10:
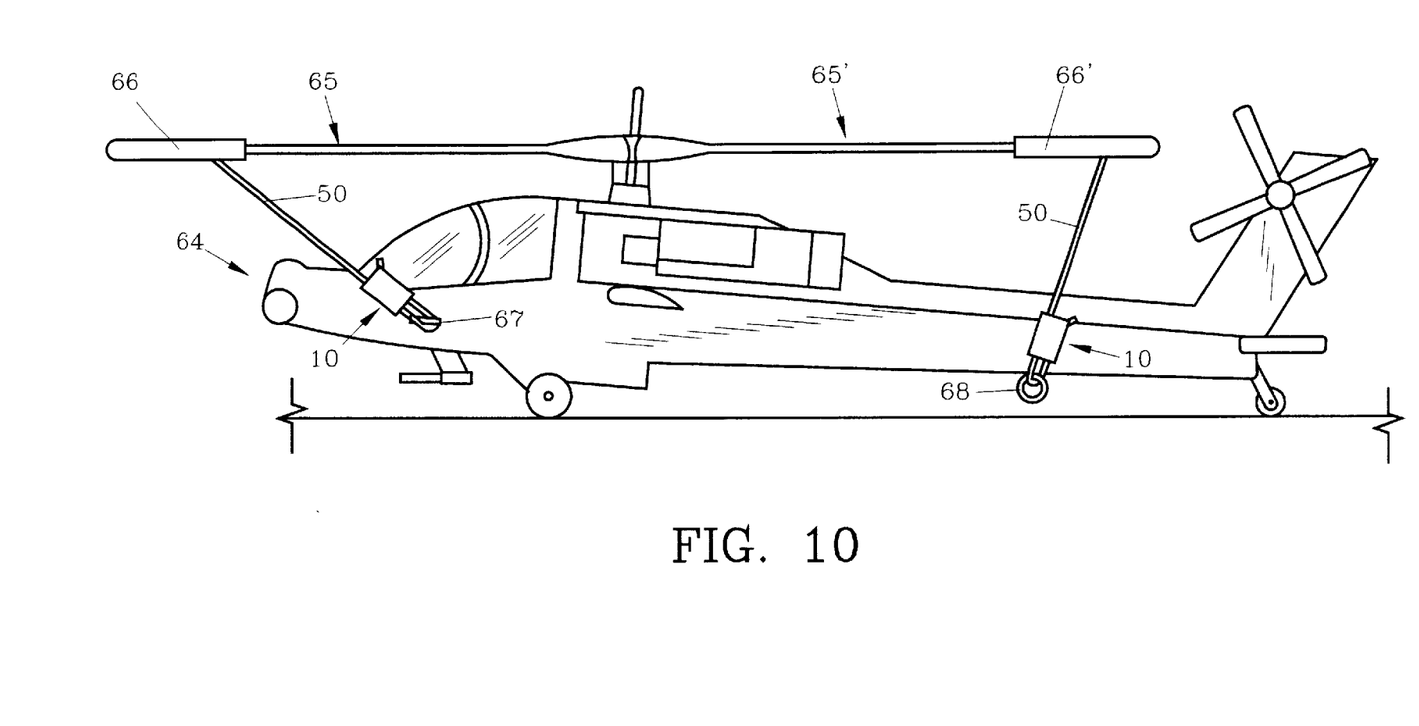
FIG. 10 pictures a typical military helicopter with the securing device affixed to maintain the rotor blade boots thereon.
Figure 11:
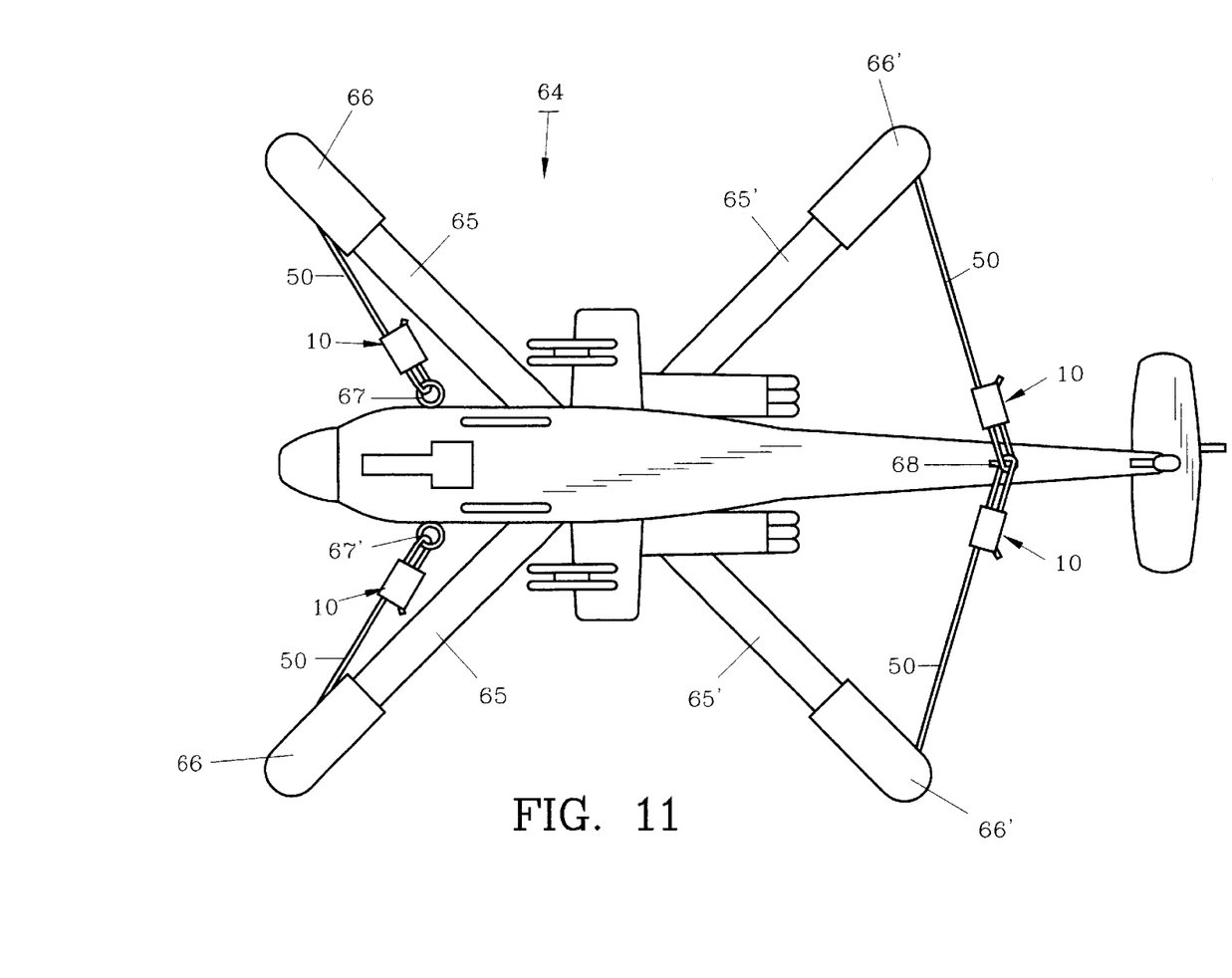
FIG. 11 shows a bottom plan view of the helicopter as shown in FIG. 10.

In FIG. 10, the right side of typical military helicopter 64 is shown whereby rotor blade boots 66, 66' are in place over the tips of front rotor blade 65 and rear rotor blade 65' and are secured to tie-down rings 67, 68 with rope-securing devices 10. Rope-securing devices 10 allow support personnel to quickly tie down rotor blades 65, 65' of helicopter 64 in a quick, consistent manner to maintain the tension on blades 65, 65' substantially equal. In FIG. 11, front rotor blades 65 and rear rotor blades 65' are shown from beneath helicopter 64 with rotor blade boots 66, 66' tied to rings 67, 67' and 68 by loops formed in rope 50.

Figure 12:
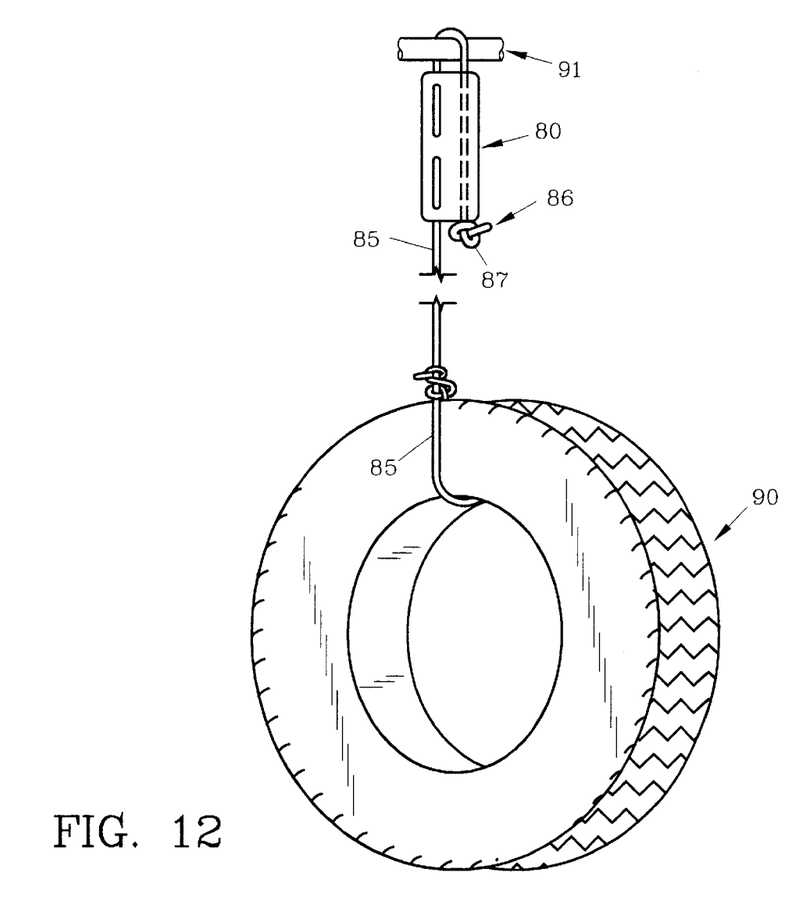
FIG. 12 illustrates a second embodiment of the rope-securing device used to suspend a tire from a tree limb with a rope.
Figure 13:
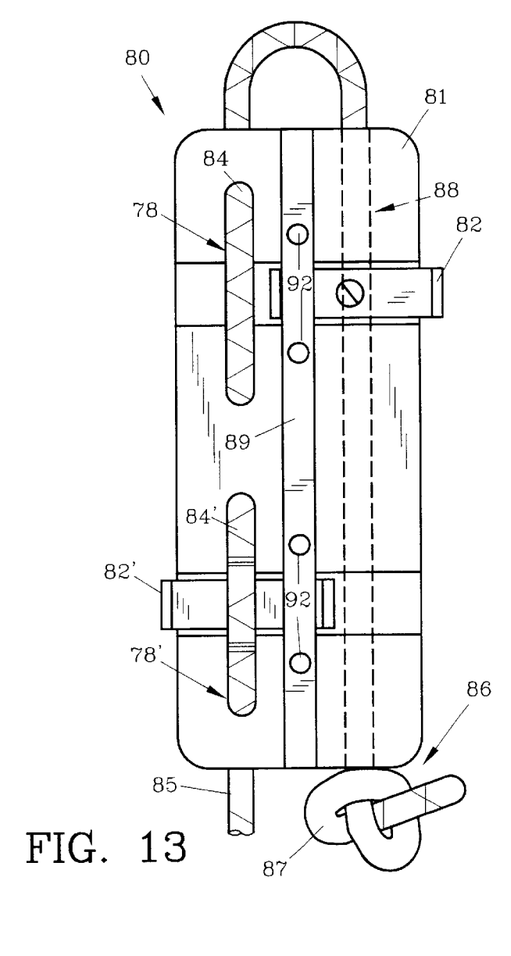
FIG. 13 shows a top plan view of the second embodiment of invention as shown in FIG. 12 with a loop of a rope formed therewith.
Figure 14:
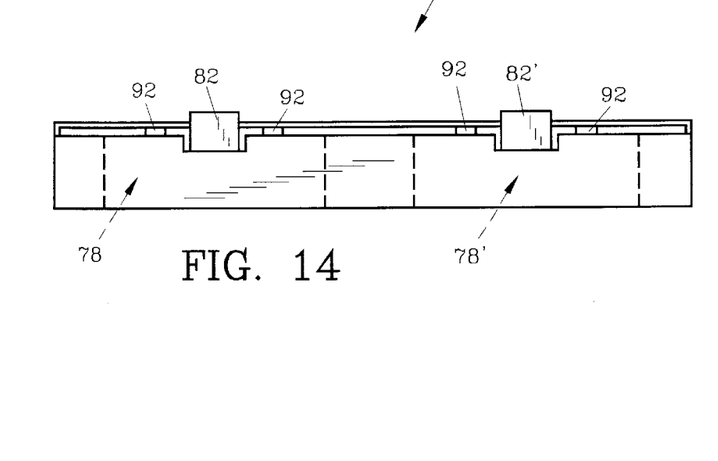
FIG. 14 illustrates a side view of the embodiment shown in FIG. 13 but without a rope.
Figure 15:
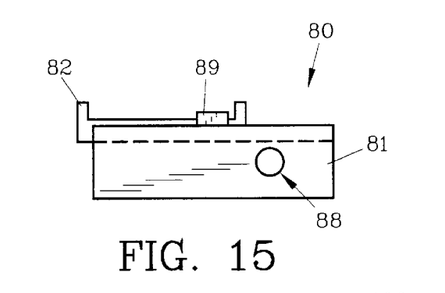
FIG. 15 demonstrates a top, end view of the device as shown in FIG. 13 also without a rope.

In FIG. 12 a second embodiment of the invention is shown whereby rope-securing device 80 is seen as used for example, in attaching tire 90 to fragmented tree limb 91 with rope 85 to form a child's swing. There, proximal end 86 of rope 85 is manually tied into knot 87 to prevent slippage through longitudinal channel 88 which passes through base 81 as seen in enlarged FIGS. 13 and 15. As would be understood, slides 82, 82' while manipulated in the same manner as earlier discussed regarding preferred rope-securing device 10 by forming half loops 84, 84' in rope 85 and slides 82, 82' passed beneath half loops 84, 84' which transgress cutouts 78, 78'. Knot 87 is used to pull rope 85 tightly after half loops 84, 84' are secured in place. As seen in FIGS. 13 and 14 only two cutouts 78, 78' are included in base 81 and cover plate 89 is held in place by threaded bolts or screws 92 which maintain slides 82, 82' on base 81.

Figure 16:
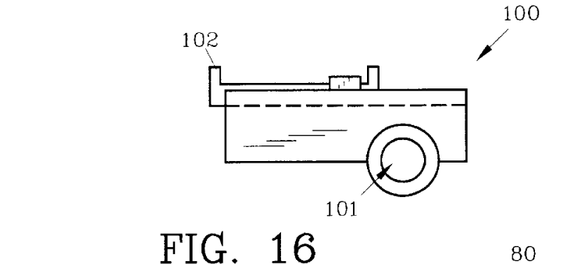
FIG. 16 illustrates a tope view of yet another embodiment of the invention as useful for larger diameter ropes.

A third embodiment of the invention similar to rope-securing device 80 is shown only in a top view in FIG. 16. There, rope-securing device 100 has large longitudinal channel 101 for accommodating a larger diameter rope (not seen), greater in diameter than for example, rope 85 seen in FIG. 13. As would be understood, a large rope would be received in cutouts (not seen) by forming half loops and engaged by slides 102, 102' (not seen) as earlier discussed but seen with half loops 84, 84' shown in FIG. 13 with rope-securing device 80.

Various changes and modifications are anticipated by skilled artisans and the illustrations and examples provided herein are for explanatory purposes and are not intended to limit the scope of the appended claims.

I claim:

1. A securing device for a rope comprising: a base, said base defining a first cutout for receiving a first rope half loop, a first slide, said first slide laterally movably attached to said base, said first slide movable through the first rope half loop to engage and secure a portion of the rope within said base.

2. The securing device of claim 1 wherein said base defines a second cutout.

3. The securing device of claim 2 wherein said base defines a third cutout.

4. The securing device of claim 3 wherein said base defines a fourth cutout.

5. The securing device of claim 2 and including a second slide, said second slide laterally movably attached to said base proximate said second cutout.

6. The securing device of claim 1 wherein said base is formed from a rigid aluminum.

7. The securing device of claim 1 further comprising a cover plate, said cover plate affixed to said base, said cover plate to maintain said slide thereon.

8. A device to secure the end of a rope comprising: a base, said base defining a plurality of cutouts, said cutouts for receiving different half loops of the rope, a slide, a cover plate, said cover plate attached to said base, said slide positioned on said base beneath said cover plate proximate said cutouts whereby said slide is laterally moveable to a first position to allow a rope half loop to transgress one of said cutouts and movable to a second position through the rope half loop to secure a portion of the rope half loop within said cutout.

9. The securing device of claim 8 wherein said slide comprises a pair of stoop blocks, each of said stop blocks located at different ends of said slide.

10. The securing device of claim 8 wherein said base defines a longitudinal channel, said channel extending from the top to the bottom of said base.

11. The securing device of claim 10 wherein said channel is sized to accommodate the diameter of said rope.

12. The securing device of claim a wherein said base is formed from aluminum.

13. The securing device of claim 8 further comprising indicia said indicia positioned on said slide.

14. The securing device of claim 13 wherein said indicia comprises a warning logo.

15. A securing device for a rope to engage half loops formed in the rope comprising: a base, said base defining a first cutout, side first cutout for receiving a rope half loop, a first slide, side first slide laterally movably across side first cutout and through a half loop to secure a portion of the rope within said base.

16. The securing device of claim 15 wherein said base defines a second cutout, a second slide, said second slide laterally movably attached to said base, said second slide selectively movably across said second cutout to engage a second half loop formed in said rope to further secure another portion of the rope within said base.

* * * * *